United States Patent
Hwang et al.

(10) Patent No.: US 12,058,203 B2
(45) Date of Patent: Aug. 6, 2024

(54) ENTRY MANAGEMENT SERVER, SYSTEM, METHOD FOR DIGITAL SERVICE-BASED TRAFFIC ORCHESTRATION

(71) Applicant: STCLab. Co., Ltd., Seoul (KR)

(72) Inventors: Chang Ho Hwang, Yongin-si (KR); Hyung Joon Park, Seoul (KR)

(73) Assignee: STCLab. Co., Ltd., Seoul (KR)

( * ) Notice: Subject to any disclaimer, the term of this patent is extended or adjusted under 35 U.S.C. 154(b) by 0 days.

(21) Appl. No.: 18/425,151

(22) Filed: Jan. 29, 2024

(65) Prior Publication Data
US 2024/0223649 A1  Jul. 4, 2024

Related U.S. Application Data

(63) Continuation of application No. PCT/KR2023/018939, filed on Nov. 22, 2023.

(30) Foreign Application Priority Data

Dec. 30, 2022 (KR) .................. 10-2022-0190177

(51) Int. Cl.
*H04L 67/1012* (2022.01)
*H04L 67/101* (2022.01)

(52) U.S. Cl.
CPC ........ *H04L 67/1012* (2013.01); *H04L 67/101* (2013.01)

(58) Field of Classification Search
None
See application file for complete search history.

(56) References Cited

U.S. PATENT DOCUMENTS

| | | | |
|---|---|---|---|
| 2012/0331127 A1* | 12/2012 | Wang | G06F 9/45558 709/224 |
| 2013/0198368 A1* | 8/2013 | Patterson | H04L 43/0852 709/224 |
| 2014/0365660 A1* | 12/2014 | Wang | H04L 67/1014 709/226 |
| 2017/0155560 A1* | 6/2017 | Lee | H04L 43/0817 |
| 2021/0406726 A1* | 12/2021 | Khatami | G06N 5/04 |

FOREIGN PATENT DOCUMENTS

| KR | 10-2013-0070500 A | 6/2013 |
|---|---|---|
| KR | 10-1654266 B1 | 9/2016 |
| KR | 10-2017-0108315 A | 9/2017 |
| KR | 10-2022-0027818 A | 3/2022 |

OTHER PUBLICATIONS

"Notice of Preliminary Examination Result"; Office Action issued in KR 10-2022-0190177; mailed by the Korean Intellectual Property Office on Jan. 30, 2023.

* cited by examiner

*Primary Examiner* — Mohamed Ibrahim
(74) *Attorney, Agent, or Firm* — Studebaker & Brackett PC

(57) ABSTRACT

Disclosed are an entry management server, system and method for digital service-based traffic orchestration. The entry management server according to an embodiment includes a communication unit, and a processor connected to the communication unit and controlling a transaction for a request received by a server system. The processor receives a request signal transmitted from a user terminal, collects status data for each of a plurality of servers within the server system, determines whether the user terminal is capable of accessing the server system, based on the collected status data, and controls transmission of the request signal to the server system based on the determined result.

9 Claims, 7 Drawing Sheets

ENTRY MANAGEMENT SERVER, SYSTEM, METHOD FOR DIGITAL SERVICE-BASED TRAFFIC ORCHESTRATION

CROSS-REFERENCE TO RELATED APPLICATIONS

The present application is a continuation of International Patent Application No. PCT/KR2023/018939, filed on Nov. 22, 2023, which is based upon and claims the benefit of priority to Korean Patent Application No. 10-2022-0190177 filed on Dec. 30, 2022. The disclosures of the above-listed applications are hereby incorporated by reference herein in their entirety.

BACKGROUND

Embodiments of the present disclosure described herein relate to a method for controlling access to a user terminal based on the status of a server system, and more particularly, relate to an entry management server, system, and method for digital service-based traffic orchestration.

As the number of concurrent users of a server system that provides a content service such as course registrations, concert reservations, and purchase events increases, the response speed of the service server providing the content service may decrease or the service may be interrupted.

A system may be composed of a WEB that provides a page composed of a hypertext markup language (HTML), a web application server (WAS) that processes application program services for request messages delivered from the WEB, and a database that stores data capable of being provided in response to query statements.

A plurality of servers within the above-described system may process operations corresponding to various request signals received from the outside. Therefore, improving the reliability of a server is of utmost importance to content service providers.

SUMMARY

Embodiments of the present disclosure provide an entry management server, system and method for digital service-based traffic orchestration to efficiently control traffic of a plurality of servers providing content services.

Problems to be solved by the present disclosure are not limited to the problems mentioned above, and other problems not mentioned will be clearly understood by those skilled in the art from the following description.

According to an embodiment, an entry management server for digital service-based traffic orchestration may include a communication unit, and a processor connected to the communication unit and controlling a transaction for a request received by a server system. The processor may receive a request signal transmitted from a user terminal, may collect status data for each of a plurality of servers within the server system, may determine whether the user terminal is capable of accessing the server system, based on the status data, may control transmission of the request signal to the server system based on the determined result, may perform learning by labeling load data compared to past traffic of each of the plurality of servers, and an available resource matching the load data, may calculate an operation pause time of a service app based on a server operation stop time point and a server operation resume time point of each of the plurality of servers predicted based on the learned result, and may determine a monitoring priority for collecting the status data for each of the plurality of servers by applying a greater weight as a difference between a load according to traffic of each of the plurality of servers and a reference value is smaller.

According to an embodiment, an entry management system for digital service-based traffic orchestration may include a service agent installed in a user terminal and generating a request signal related to a specific content service, a plurality of server agents respectively installed on a plurality of servers within a server system and collecting status data of a corresponding server, and an entry management server that receives the request signal from the service agent, collects the status data from the plurality of server agents, determines whether the user terminal is capable of accessing the server system based on the status data, and controls transmission of the request signal to the server system based on the determined result. The entry management server may perform learning by labeling load data compared to past traffic of each of the plurality of servers, and an available resource matching the load data, may calculate an operation pause time of a service app based on a server operation stop time point and a server operation resume time point of each of the plurality of servers predicted based on the learned result, and may determine a monitoring priority for collecting the status data for each of the plurality of servers by applying a greater weight as a difference between a load according to traffic of each of the plurality of servers and a reference value is smaller.

According to an embodiment, a method performed by an entry management server may include receiving a request signal transmitted from a user terminal, collecting status data for each of a plurality of servers within a server system, determining whether the user terminal is capable of accessing the server system, based on the status data, controlling transmission of the request signal to the server system based on the determined result, performing learning by labeling load data compared to past traffic of each of the plurality of servers, and an available resource matching the load data, estimating a server operation stop time point and a server operation resume time point of each of the plurality of servers based on the learned result, and calculating an operation pause time of a service app based on the server operation stop time point and the server operation resume time point. The collecting of the status data may include determining a monitoring priority for collecting the status data for each of the plurality of servers by applying a greater weight as a difference between a load according to traffic of each of the plurality of servers and a reference value is smaller.

Besides, a computer program stored in a computer-readable recording medium for implementing the present disclosure may be further provided.

In addition, a computer-readable recording medium for recording a computer program for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
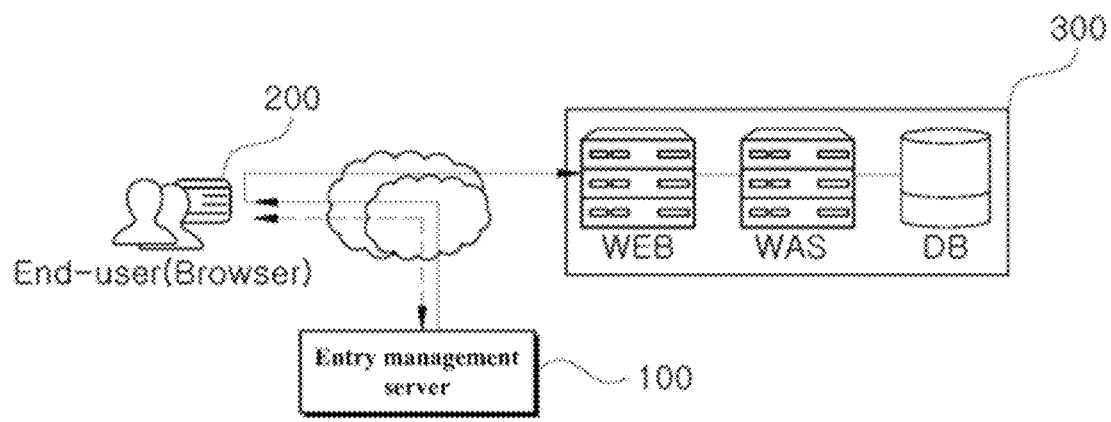
FIG. 1 is a diagram showing an overall system for describing an entry management method into a server system, according to an embodiment of the present disclosure.

The same reference numerals denote the same elements throughout the present disclosure. The present disclosure does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

In this specification, an 'entry management server according to an embodiment of the present disclosure' includes all various devices capable of providing results to a user by performing arithmetic processing. For example, the entry management server according to an embodiment of the present disclosure may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

FIG. 1 is a diagram showing an overall system for describing an entry management method into a server system, according to an embodiment of the present disclosure.

Referring to FIG. 1, an entry management server 100 may be located between a user terminal (End-User (Browser)) 200 and a server system 300 to manage the entry of the user terminal 200 into the server system 300.

The entry management server 100 may perform a procedure of blocking, detouring, and entry permission managing for the user terminal 200 that requests an entry into the server system 300.

The blocking may refer to a procedure of transmitting blocking information to the user terminal 200 to block selection of a button (e.g., submission and confirmation, or the like) for generating a specific action when the number of accesses per second is at a macro level.

The detouring may refer to a detour procedure of directly entering the server system 300 without waiting in a case of a specific policy or major client even when a queue for waiting for entry to the server system 300 is present.

The entry permission management refers to normal standby management for an entry into the server system 300, and may refer to a procedure for managing the resource or status of the target server 30 that provides a content service by controlling the entry based on the number of allowable entries.

In this case, the number of allowable entries may refer to the number of users who are issued a key of the entry management server 100 and are capable of simultaneously entering a specific transaction (e.g., a login button, a course registration button, or the like) of the server system 300. At this time, the number of users may actually mean the number of user terminals 200 capable of entering the server system 300.

The server system 300 may include a web server, a web application server (hereinafter referred to as "WAS"), and a database (DB) server. In this case, the DB server may also be referred to as a "database management system (DBMS)".

A web server may refer to a server that mainly processes requests from a client such as a web browser or a web crawler based on HTTP protocol. When the web server receives an HTTP request, the web server may reply with an HTTP response.

For example, the web server may receive a file path name and may return static file content (html, jpeg, css, or the like) that matches the path.

The web server may deliver a request for providing dynamic content to the WAS, may receive the processed result from the WAS, and may deliver the result to the client.

The WAS refers to an application server using HTTP, and may include a container that makes dynamic data available to a web server specialized in processing static HTTP data.

The WAS may be an application server for providing dynamic content that requires database inquiry or various logic processing. The WAS may be middleware (a software engine) that executes applications on computers or devices through HTTP. The WAS may also be named a web container or servlet container. In this case, the container may refer to software capable of executing JSP and Servlet.

The WAS may be applied in a distributed environment for processing functions such as distributed transactions, security, messaging, and thread processing.

In detail, the WAS may implement program execution environments, database access functions, and multiple transaction management functions. The transaction may refer to a logical unit of work.

The WAS may receive the corresponding data from the database at the request of a user, may generate results in real time according to business logic, and may provide the results. The WAS may include a plurality of web application servers. The number of web application servers respectively applied to the server systems 300 may be different.

The DB server may refer to a structure that stores and manages data. In this case, the database may reply the corresponding data at the request of the WAS.

In general, there are only individual control solutions that control traffic for some (e.g., web servers) of elements that make up the server system 300. The conventional entry management server 100 may only consider the status of the web server located at the front end of the server system 300. The web server that is responsible for an initial response in the server system 300 is important. It may be limited to perform overall traffic control based only on the indicators of the web server without knowing the status of the application server or DB server placed at the rear end of the web server.

According to an embodiment of the present disclosure, in a highly segmented server system environment, transactions on requests received by the server system 300 may be controlled in consideration of the overall environment and status of the server system 300.

In other words, the entry management server 100 according to an embodiment of the present disclosure may be configured to maintain a network environment in a good condition by controlling transactions for requests transmitted to the server system 300 in consideration of the environment and status of the entire server system including the plurality of servers 310 within the server system 300.

Figure 2:
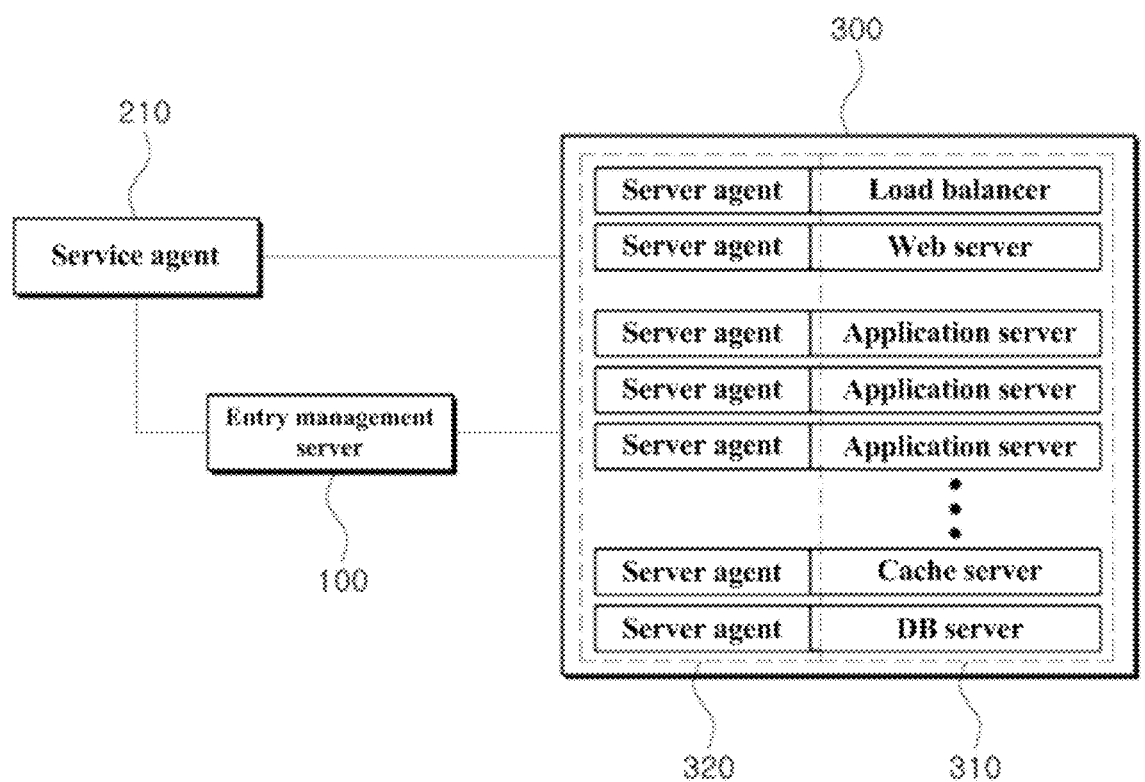
FIG. 2 is a block diagram showing a configuration of an entry management system, according to an embodiment of the present disclosure.

As shown in FIG. 2, each of the plurality of servers 310 within the server system 300 described above has its own distinct role, thereby improving the overall stability of the server system 300.

When the web server receives a connection request sent from the user terminal 200, the web server may call an application server, etc. The application server may be connected in a structure for calling the DB server, etc., as needed.

The server system 300 needs to have sufficient resources for reliably processing requests received from the user terminal 200. When the server system 300 runs out of resources, the response of the server 310 may be slow, the access of the server 310 may be delayed, or the operation of the server 310 may stop.

According to an embodiment of the present disclosure, in a cloud environment, there is a need to reserve some resources in preparation for traffic spikes. This will be more fully described later.

FIG. 2 is a block diagram showing a configuration of an entry management system, according to an embodiment of the present disclosure.

Figure 3:
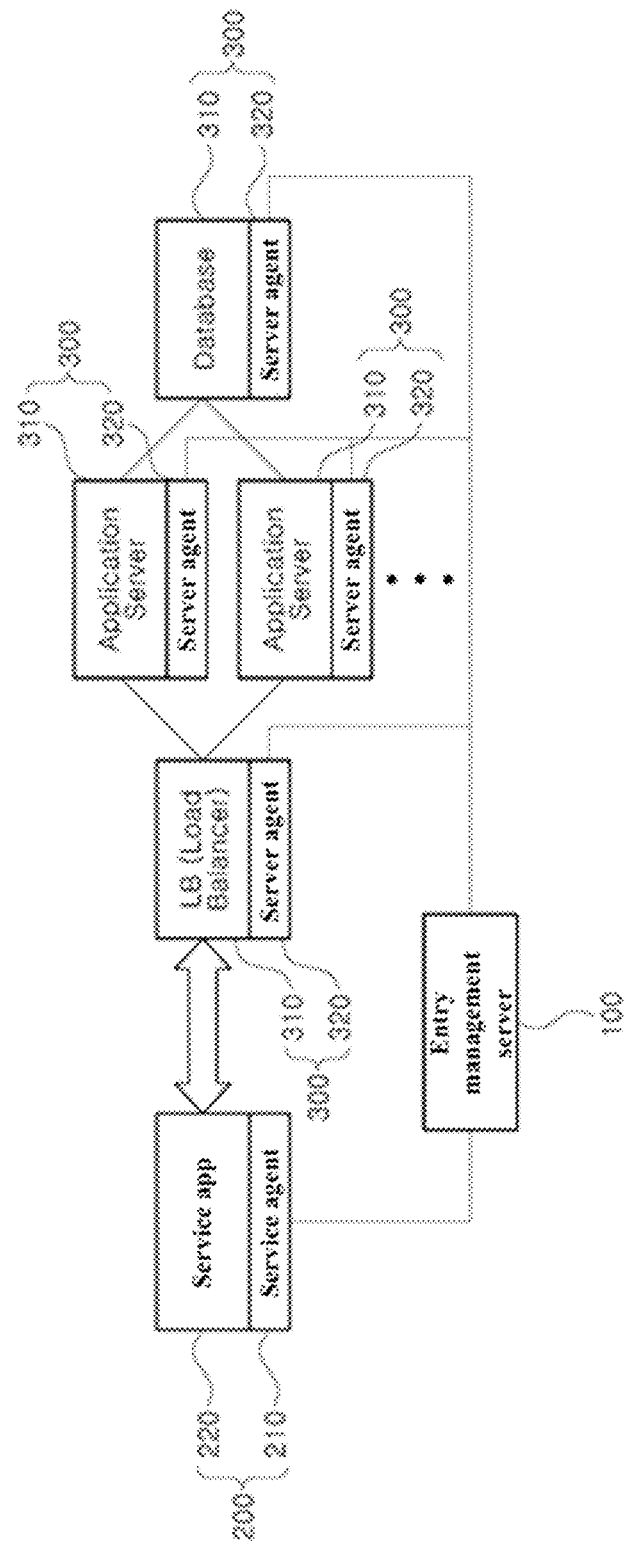
FIG. 3 shows a connection relationship of an entry management system according to an embodiment of the present disclosure.

Hereinafter, the description will be given with reference to FIG. 3 showing a connection relationship of an entry management system according to an embodiment of the present disclosure.

Referring to FIG. 2, an entry management system may include the entry management server 100, a service agent 210, and a plurality of server agents 320. That is, the entry management system according to an embodiment of the present disclosure may include the plurality of server agents 320 respectively installed on the plurality of servers 310, the service agent 210 installed in a service app 220 in FIG. 3 of the user terminal 200, and the entry management server 100.

The service agent 210 may be installed in the user terminal 200 in FIG. 1 and may be a configuration for generating a request signal related to a specific content service.

The plurality of server agents 320 may be respectively installed on the plurality of servers 310 within the server system 300 to collect status data including resource status information of the corresponding server, and allowable traffic level information calculated based on the resource status information. In this case, the server agent 320 may preferentially obtain requests received by the server 310 on which the server agent 320 is installed. In other words, the server agent 320 may hook the request delivered to the server 310 on which the server agent 320 is installed.

The allowable traffic level information described above may mean the allowable traffic level calculated based on the resource status information.

The plurality of server agents 320 may be installed on each of the plurality of servers 310 within the server system 300, and may be applied in such a way in which the plurality of server agents 320 are installed without changing the existing code of the server depending on the characteristics of each server element. For example, the server agent 320 may be installed without modifying the existing code for each framework through techniques such as function redefinition in web JavaScript, byte code instrumentation (BCI) in Java series, method swizzling in iOS series, or the like.

The entry management server 100 may receive a request signal from the service agent 210, may collect status data from the plurality of server agents 320, may determine whether the user terminal 200 access the server system 300, in response to the request signal based on the collected status data, and may control the transmission of the request signal from the user terminal 200 to the server system 300 based on the determined result.

Referring to FIG. 3, the entry management server 100 may transmit and receive information through the service agent 210 in the user terminal 200 and the server agent 320 in the service server 300.

Figure 4:
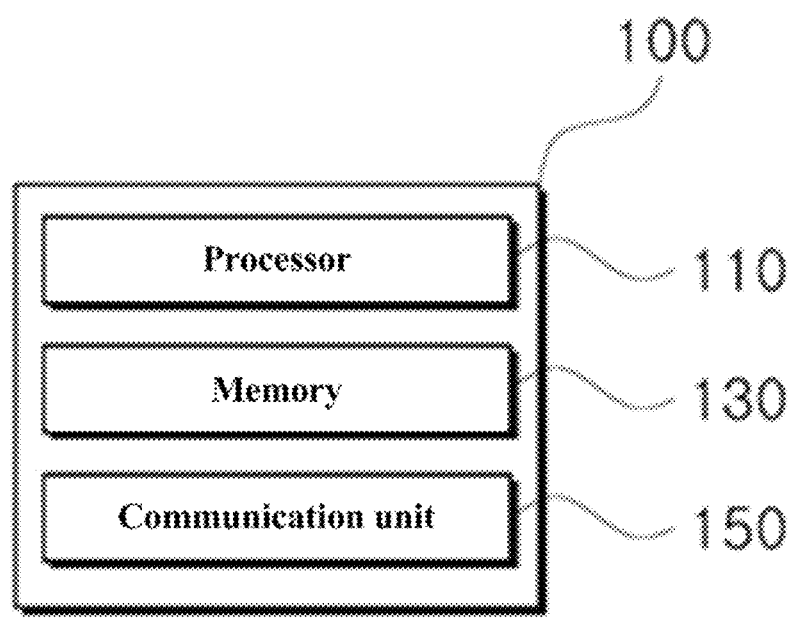
FIG. 4 is a block diagram showing a configuration of an entry management server, according to an embodiment of the present disclosure.

FIG. 4 is a block diagram showing a configuration of an entry management server, according to an embodiment of the present disclosure.

Hereinafter, an entry management method according to an embodiment of the present disclosure will be described with reference to FIGS. 5 to 7, which are example diagrams for describing an entry management method.

Referring to FIG. 4, the entry management server 100 includes a processor 110, a memory 130, and a communication unit 150. The components shown in FIG. 4 are not essential in implementing the entry management server 100. The entry management server 100 described herein may have more or fewer components than those listed above.

The processor 110 may be a configuration, which is connected to the communication unit 150 and which is used to control a transaction for a request received by the server system 300.

Referring to FIG. 2, the server system 300 may include at least one or more servers 310 among a load balancer, a web server, a cache server, an application server, and a DB server. Accordingly, the server agent 320 installed on each of the servers 310 may be named a load balancer agent, a web server agent, a cache server agent, an application server agent, or a DB server agent.

The load balancer may be a configuration that distributes requests from the user terminal 200 to the servers 310 in an environment where servers such as the server system 300 are distributed. In this case, each server may mean a web server, a cache server, an application server, and a DB server.

The web server may receive a request from the user terminal 200 and then may return static data (html, etc.) or may request dynamic data from the application server.

The cache server may be a configuration that temporarily stores data requested by another user terminal 200 and then responds relatively quickly depending on the request.

The application server may be a configuration that performs tasks such as logic processing or calculations and requests DB data from the DB server as needed. The application server according to an embodiment of the present disclosure may mean WAS.

The DB server may be a configuration that organizes and stores information.

The processor 110 may receive a request signal transmitted from the user terminal 200. The request signal may refer to various requests (e.g., a login, a detailed information request, a reservation request, and the like) related to content services provided through the service server 300.

For example, the processor 110 may receive a request signal transmitted from the user terminal 200 through the server agent 320.

In detail, the server agent 320 preferentially obtains (intercepts) the request signal received by the server 310 on which the server agent 320 is installed, transmits the obtained request to the processor 110 of the entry management server 100 in a state where the processing of the obtained request is paused, and determines whether to allow entry, by analyzing the status of the corresponding server.

The processor 110 may collect status data of each of the plurality of servers 310 within the server system 300. The status data may be status information to be considered when a request signal from the user terminal 200 is processed in the plurality of servers 310 within the server system 300. For example, the status data may refer to resource status information, and information about the allowable traffic level derived from the resource status information. This status data may also be applied to other examples.

For another example, when a flow control request transmitted from the server system 300 is received as traffic to the server system 300 is concentrated beyond a setting value, the processor 110 may collect status data by monitoring the plurality of servers 310. In this case, the flow control request may mean requesting the entry management server 100 to control the flow rate of the request signal transmitted from the user terminal 200.

In detail, when receiving a request signal from the user terminal 200, the processor 110 may receive status data of the plurality of servers 310 while communicating with a server agent installed on each of the plurality of servers 310 in addition to the web server. When access to the plurality of servers 310 is possible based on the status data, the processor 110 may transmit a permission signal again to the service app 220. Afterward, the service app may be permitted to access the plurality of servers 310.

For another example, when traffic to the server system 300 is concentrated beyond the setting value, as a code installed in the service app 220 in FIG. 3 in the user terminal 200 is executed, the user terminal 200 may transmit a request signal transmitted to the server system 300 (e.g., a web server) to the entry management server 100. In this case, as the processor 110 receives the request signal from the user terminal 200, the processor 110 may collect status data by monitoring the plurality of servers 310.

The processor 110 may determine whether access to the server system 300 of the user terminal 200 is possible based on the request signal, based on the collected status data. In other words, after determining whether the request signal is capable of being processed based on the status of the corresponding server 310 in the server system 300, which will process the request signal of the user terminal 200. When the request signal is capable of being processed, the processor 110 may deliver the request signal to the corresponding server 310.

As shown in FIG. 3, the load balancer, the web server, the cache server, the application server, and the DB server may include the server agent 320 for transmitting and receiving information with the processor 110 installed in each of the load balancer, the web server, the cache server, the application server, and the DB server.

The server agent 320 may collect status data including resource status information of the server 310 where the server agent 320 is installed, and allowable traffic level information calculated based on the resource status information.

In this case, the allowable traffic level information may be determined within the entry management server 100 by performing direct calculations through the server agent 320 to transmit the result to the entry management server 100 or to transmit only resource status information to the entry management server 100.

The server agent 320 may preferentially obtain a request received from the server, on which the server agent 320 is installed, may communicate with the entry management server 100 with the obtained request paused, and may determine whether to enter the request based on the possibility of the entry analyzed for the server 310.

The processor 110 may determine whether the user terminal 200 is capable of accessing the server system 300, based on status data transmitted from the server agent 320.

The processor 110 may determine whether to allow entry of the user terminal 200 or whether to create a queue, in consideration of the status data collected from the server agent 320 for each of the plurality of servers 310. When the user terminal 200 is incapable of accessing the plurality of servers 310, the processor 110 may control entry by creating a queue, in which the user terminal 200 waits.

In other words, according to an embodiment of the present disclosure, because elements of the plurality of servers 310 are organically connected to each other, it may be considered that overload conditions may also affect other servers when one server is overloaded.

In detail, even when it is determined that entry is permitted, based on status data collected from the server agent of the first server that received the entry request, the processor 110 is connected to the first server to need the help of the second server, which is responsible for processing some logic for returning results from the first server. When it is difficult to enter the second server, the processor 110 may not allow entry to the first server. In this case, the processor 110 may allow the user terminal 200 to wait in a queue.

For example, when a request to allow entry to the server agent of a web server is detected from the service app 220 that will access a first page of the web server, the processor 110 may determine whether to allow the service app 220 to enter the web server, by identifying the resource occupancy status of an application server (e.g., WAS, API server, or the like), which is responsible for processing the logic of the first page and returning the result.

For another example, when a request to access a first function of the application server is detected by the server agent of the application server, the processor 110 may allow an entry request of the application server by identifying the resource occupancy status of the DB server accessed during the processing of the first function.

In other words, the processor 110 may even analyze the impact on other servers depending on the connection relationship between a plurality of servers and the specific contents of the request signal of a specific server by analyzing the collected status data and request signals.

In detail, when the processing of a web server, an application server, and a DB server is required to generate and reply response data corresponding to the request signal transmitted from the user terminal 200, the processor 110 may consider a plurality of servers and the connection relationship between a plurality of servers for generating response data corresponding to the request signal. For example, the web server needs to receive a first web page request for displaying the product list; the application server needs to receive a first method request for generating a list of products, which need to be responded to within the first web page; and, the DB server needs to process an execution request reception for a product list search SQL statement included in the first method. In this case, the processor 110 may determine whether the user terminal 200 accesses the server system 300, in consideration of the status data of the web server, the application server, and the DB server.

The processor 110 may process operations such as access of the user terminal 200 to the server system 300 by predicting the resources of the plurality of servers 310.

In detail, the processor 110 may perform learning by labeling load data compared to past traffic for each of the plurality of servers 310 in the server system 300, and available resources matched thereto.

The processor 110 may predict a server operation stop time point and a server operation resume time point for each of the plurality of servers 310 based on the learning results.

The processor 110 may calculate an operation pause time of a service app based on the server operation stop time point and the server operation resume time point, and may deliver the operation pause time to the user terminal 200.

The processor 110 may check a reception signal change amount of the server agent 320 and may adjust the monitoring period for collecting status data from the server agent 320 according to the check result.

In this case, when the reception signal change amount increases to be greater than or equal to a first standard value, the processor 110 may adjust the monitoring cycle of status data such that the monitoring cycle of status data is shorter than a current setting value. When the reception signal change amount decreases to be smaller than or equal to a second standard value, the processor 110 may adjust the monitoring cycle of status data such that the monitoring cycle of status data extends beyond the current setting value. In other words, monitoring for the server 310 having a relatively large number of reception signals is performed relatively frequently.

The processor 110 may determine a monitoring priority for each of the plurality of servers 310 by applying weights based on a difference between a reference value and the load according to the traffic of each of the plurality of servers 310.

For example, the processor 110 may determine the monitoring priority for each of the plurality of servers 310 by applying weights based on the difference between a reference value and the load according to the traffic of each of the plurality of servers 310.

Figure 5:
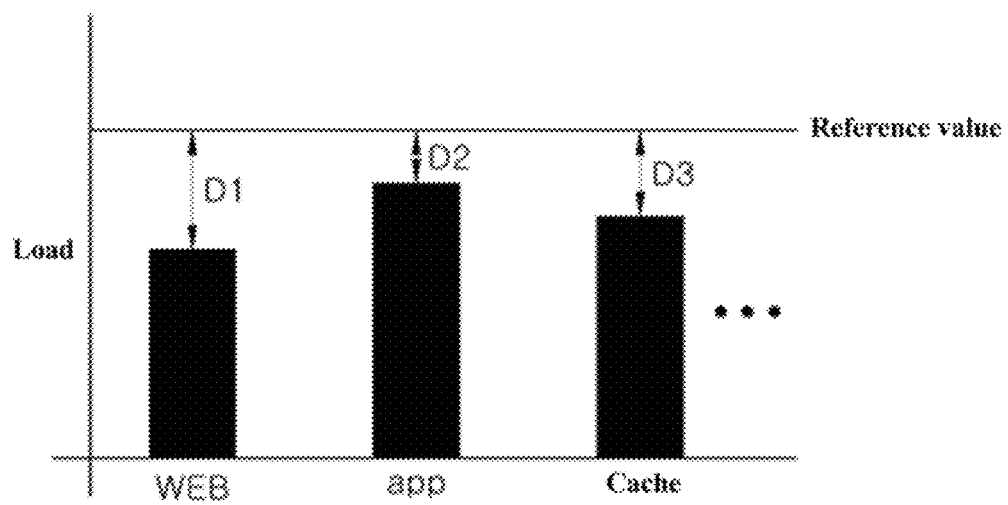
FIGS. 5 and 6 are flowcharts for describing an entry management method, according to an embodiment of the present disclosure.

For example, referring to FIG. 5, when differences between a reference value and loads of a web server, an application server, and a cache server are D1, D2, and D3, the processor 110 may assign the highest weight A1 to the application server, may assign the next highest weight A2, to the cache server, and may assign the lowest weight A3 to the web server. Due to the weights, the processor 110 may set the first monitoring priority for the application server, may set the second monitoring priority for the cache server, and may set the third monitoring priority for the web server. In other words, the processor 110 may apply a relatively large weight as the difference between the load and the reference value becomes smaller such that the monitoring priority is determined as a higher priority.

For another example, the processor 110 may determine the server of interest, which is expected to be a bottleneck, from among the plurality of servers 310, based on the difference between the load according to the traffic of each of the plurality of servers 310 and a reference value, and may adjust the monitoring period of the determined server of interest to be shorter than a current setting value. In other words, the processor 110 may adjust the monitoring frequency of the server 310, where a bottleneck is expected, to be shorter than the current setting value, thereby preventing the bottleneck in advance.

The processor 110 may adjust the monitoring period by applying a weight to the server of interest.

Figure 6:
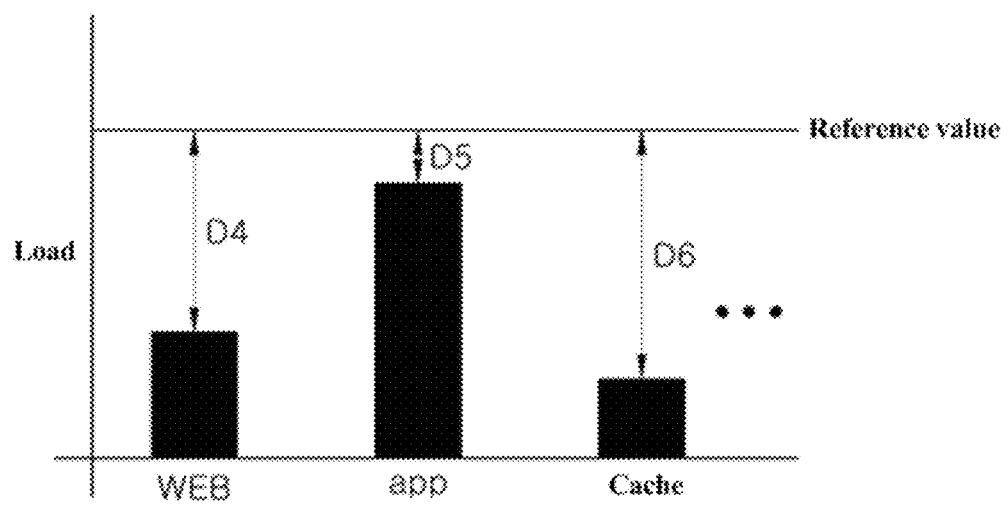

For example, referring to FIG. 6, when differences between the reference value and loads of the web server, the application server, and the cache server are D4, D5, and D6, the processor 110 may determine the application server as the server of interest, excluding the web server and the cache server, which are servers where the difference between the load and the reference value exceeds a standard value. Afterwards, the processor 110 may assign weight A4 only to the application server. Due to the weights, the processor 110 may shorten the monitoring period for the application server.

The processor 110 may control the transmission of the request signal from the user terminal 200 to the server system 300 based on the determined result.

In detail, when the result of analyzing the status data of the server system 300 indicates that the corresponding server 310 in the server system 300 is in a state capable of performing processing corresponding to a request signal from the user terminal 200, the processor 110 may deliver the request signal from the user terminal 200 to the server system 300. In other words, the processor 110 allows the user terminal 200 to access the server system 300.

On the other hand, when the result of analyzing the status data of the server system 300 indicates that the corresponding server 310 in the server system 300 is in a state incapable of performing processing corresponding to a request signal from the user terminal 200, the processor 110 may wait for access to the user terminal 200 without delivering the request signal from the user terminal 200 to the server system 300.

The memory 130 may store a computer program for providing an entry management method, and the stored computer program may be read and driven by the processor 110. The memory 130 may store any type of information generated or determined by the processor 110 and any type of information received by the communication unit 150.

The memory 130 may store data supporting various functions of the entry management device 100 and a program for the operation of the processor 110, may store pieces of input/output data, and may store a plurality of application programs (or applications) running on the entry management device 100, data for operations of the entry management device 100, and commands. At least part of the application programs may be downloaded from an external server through wireless communication.

The memory 130 may include the type of a storage medium of at least one of a flash memory type, hard disk type, a solid state disk (SSD) type, a silicon disk drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Furthermore, the memory may be separate from the apparatus, but may be a database connected by wire or wirelessly.

The communication unit 150 may include one or more components capable of communicating with an external device, and may include, for example, at least one of a broadcast reception module, a wired communication module, a wireless communication module, a short-range communication module, and a location information module.

Although not illustrated, the entry management server 100 according to an embodiment of the present disclosure may further include an output unit and an input unit.

The output unit may display a user interface (UI) for providing information related to the entry management server 100 in addition to entry management results. The output unit may output any type of information generated or determined by the processor 110 and any type of information received by the communication unit 150.

The output unit may include at least one of a liquid crystal display (LCD), a thin film transistor-liquid crystal display (TFT LCD), an organic light emitting diode (OLED), a flexible display, and a 3D display. Some display modules thereof may be implemented with a transparent display or a light-transmitting display such that a user sees the outside through the display modules. This may be called a transparent display module, and a typical example of the transparent display module includes a transparent OLED (TOLED).

The input unit may receive information entered by the user. The input unit may include keys and/or buttons on a user interface for receiving information entered by a user, or physical keys and/or buttons. A computer program for controlling a display according to an embodiment of the present disclosure may be executed depending on a user input through an input unit.

Figure 7:
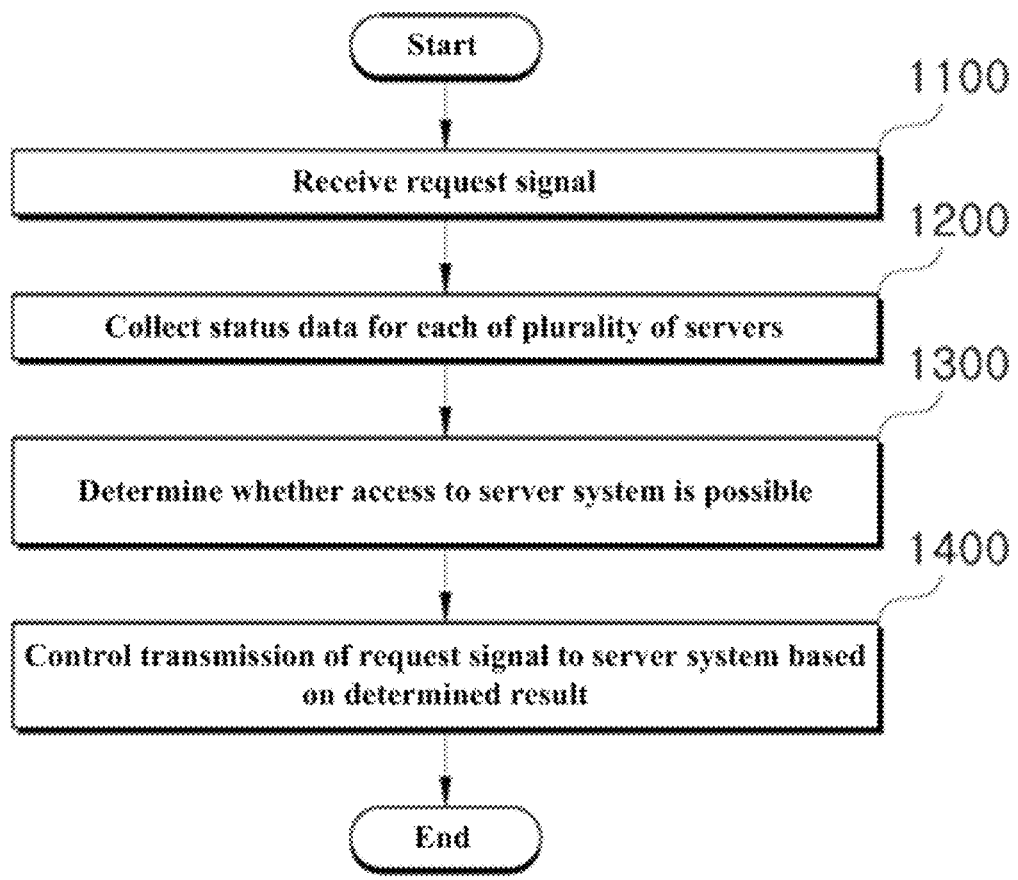
FIG. 7 is a flowchart for describing an entry management method, according to an embodiment of the present disclosure.

FIG. 7 is a flowchart for describing an entry management method, according to an embodiment of the present disclosure.

The entry management method described later is the same method implemented in the entry management server 100 of FIGS. 1 to 7 described above, and redundant detailed description will be omitted.

The processor 110 of the entry management server 100 may receive a request signal transmitted from the user terminal 200 (1100).

Next, the processor 110 may collect status data for each of the plurality of servers 310 within the server system 300 (1200).

Next, the processor 110 may determine whether access to the server system 300 of the user terminal 200 is possible based on the request signal, based on the collected status data (1300).

Next, the processor 110 may control the transmission of the request signal from the user terminal 200 to the server system 300 based on the determined result (1400).

In the meantime, the method according to an embodiment of the present disclosure may be implemented by a program (or an application) and may be stored in a medium such that the program is executed in combination with a server being hardware.

The disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the present disclosure belongs will understand that the present disclosure may be practiced in forms other than the disclosed embodiments without altering the technical ideas or essential features of the present disclosure. The disclosed embodiments are examples and should not be construed as limited thereto.

According to the above-mentioned problem solving means of the present disclosure, a smooth network environment may be provided by controlling transactions for requests received through a server system in consideration of the status of the entire server system in a highly segmented server system environment.

Effects of the present disclosure are not limited to the effects mentioned above, and other effects not mentioned will be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An entry management server for digital service-based traffic orchestration, the entry management server comprising:
   a communication unit; and
   a processor connected to the communication unit and configured to control a transaction for a request received by a server system,
   wherein the processor is configured to:
   receive a request signal transmitted from a user terminal;
   collect status data for each of a plurality of servers within the server system;
   determine whether the user terminal is capable of accessing the server system, based on the status data;
   control transmission of the request signal to the server system based on the determined result;
   perform learning by labeling load data compared to past traffic of each of the plurality of servers, and an available resource matching the load data;
   calculate an operation pause time of a service app based on a server operation stop time point and a server operation resume time point of each of the plurality of servers predicted based on the learned result; and
   determine a monitoring priority for collecting the status data for each of the plurality of servers by applying a greater weight as a difference between a load according to traffic of each of the plurality of servers and a reference value is smaller.

2. The entry management server of claim 1, wherein the server system includes at least one server among a load balancer, a web server, a cache server, an application server, and a DB server.

3. The entry management server of claim 2, wherein the load balancer, the web server, the cache server, the application server, and the DB server include a server agent for transmitting and receiving information with the processor installed in each of the load balancer, the web server, the cache server, the application server, and the DB server,
   wherein the server agent collects status data including resource status information of a server where the server agent is installed, and allowable traffic level information calculated based on the resource status information, and
   wherein the processor is configured to:
   determine whether the user terminal is capable of accessing the server system, based on the status data transmitted from the server agent.

4. The entry management server of claim 3, wherein the processor is configured to:
   check a reception signal change amount of the server agent;
   adjust a monitoring period for collecting the status data from a corresponding server agent based on the check result;
   when the reception signal change amount increases such that the reception signal change amount is greater than or equal to a first standard value, adjust the monitoring period of the status data to be shorter than a current setting value; and
   when the reception signal change amount decreases such that the reception signal change amount is smaller than or equal to a second standard value, adjust the monitoring period of the status data to be longer than the current setting value.

5. The entry management server of claim 1, wherein the processor is configured to:
   determine a server of interest, which is expected to be a bottleneck, from among the plurality of servers based on a difference between a load according to traffic of each of the plurality of servers and a reference value; and
   adjust a monitoring period of the determined server of interest to be shorter than a current setting value.

6. The entry management server of claim 5, wherein the processor is configured to:
   adjust the monitoring period by applying a weight to the server of interest.

7. An entry management system for digital service-based traffic orchestration, the entry management system comprising:
   a service agent installed in a user terminal and configured to generate a request signal related to a specific content service;
   a plurality of server agents respectively installed on a plurality of servers within a server system and configured to collect status data of a corresponding server; and
   an entry management server configured to:
   receive the request signal from the service agent;
   collect the status data from the plurality of server agents;
   determine whether the user terminal is capable of accessing the server system based on the status data; and
   control transmission of the request signal to the server system based on the determined result,
   wherein the entry management server is configured to:
   perform learning by labeling load data compared to past traffic of each of the plurality of servers, and an available resource matching the load data;
   calculate an operation pause time of a service app based on a server operation stop time point and a server operation resume time point of each of the plurality of servers predicted based on the learned result; and
   determine a monitoring priority for collecting the status data for each of the plurality of servers by applying a greater weight as a difference between a load according to traffic of each of the plurality of servers and a reference value is smaller.

8. A method performed by an entry management server, the method comprising:
   receiving a request signal transmitted from a user terminal;
   collecting status data for each of a plurality of servers within a server system;
   determining whether the user terminal is capable of accessing the server system, based on the status data;
   controlling transmission of the request signal to the server system based on the determined result;
   performing learning by labeling load data compared to past traffic of each of the plurality of servers, and an available resource matching the load data;
   estimating a server operation stop time point and a server operation resume time point of each of the plurality of servers based on the learned result; and
   calculating an operation pause time of a service app based on the server operation stop time point and the server operation resume time point, and
   wherein the collecting of the status data includes:
   determining a monitoring priority for collecting the status data for each of the plurality of servers by applying a greater weight as a difference between a load according to traffic of each of the plurality of servers and a reference value is smaller.

9. A computer-readable recording medium storing a program combined with a computer being a piece of hardware to execute an entry management method for digital service-based traffic orchestration performed by the entry management server of claim 8.

* * * * *